Nov. 9, 1926.

J. O. MAUBORGNE ET AL 1,606,476

RADIO SIGNALING SYSTEM

Filed May 24, 1920     3 Sheets-Sheet 1

Inventor
J. O. Mauborgne
Lucy Hill,
By Robert H. Young
Attorney

Nov. 9, 1926.

J. O. MAUBORGNE ET AL 1,606,476

RADIO SIGNALING SYSTEM

Filed May 24, 1920   3 Sheets-Sheet 2

Nov. 9, 1926.

J. O. MAUBORGNE ET AL 1,606,476

RADIO SIGNALING SYSTEM

Filed May 24, 1920 3 Sheets-Sheet 3

Patented Nov. 9, 1926.

1,606,476

UNITED STATES PATENT OFFICE.

JOSEPH O. MAUBORGNE AND GUY HILL, OF WASHINGTON, DISTRICT OF COLUMBIA.

RADIO SIGNALING SYSTEM.

Application filed May 24, 1920. Serial No. 383,720.

Our invention relates to the art of radio signaling having for its dominant object the use of a resonance wave coil for the reception of radio signals. The resonance wave coil, which we will designate hereafter simply as wave coil, functions as a complete antenna system, including the antenna proper, the tuning elements associated with it, and the ground or counterpoise, which in the present practice are required for the reception of radio signals unless the closed loop form of antenna be used.

In our method we make use of a wave coil of distributed inductance and capacity which are of such magnitude as to insure wave development along the coil for the frequencies of the signals desired to receive. In its one form the wave coil is made in the form of a long helix, uniformly wound with fine insulated wire closely spaced so that the inductance per unit length is relatively large. We have found that it is desirable to wind the wire coil on a material having high insulating properties such as micarta or bakelite dilecto. We get, therefore, in a comparatively short coil the equivalent condition of a long line in the matter of wave development. The electromagnetic waves of the incoming signals act uniformly on each element of the wave coil and we have accordingly a condition where the inductance, capacity, resistance of the coil, and the E. M. F. induced in it by the incoming signals are all of a distributed character, which makes it in a sense an ideal wave conductor.

As a detecting instrument, we may employ an electron tube connecting the grid to a point on the coil which is the loop of the potential of the particular signal we desire to receive; the filament connection may be entirely left off. We prefer, however, to use as a detecting instrument a suitable multistage amplifier, comprising either radio or audio amplification stages, or a combination of the two, depending upon the conditions under which the apparatus is to be used, together with a suitable detector unit; the lead from the slider on the wave coil in this case being connected to the input grid terminal of the amplifier. The grid connection to the coil may be accomplished in three different ways; either by direct contact, electrostatic or electromagnetic coupling. The electrostatic coupling is accomplished by placing a sliding metal ring on the coil and connecting the grid to the said metal ring. By moving the grid connection along the coil different loop potential points are located, corresponding to the different incoming signals.

It was also found that when the longitudinal axis of the coil is perpendicular to the direction of propagation of the signals two potential loops may occur, one near each end of the coil, these potential loops being substantially of the same amplitude. When the coil is turned through an angle in the horizontal plane, the potential loop near that end of the coil which points in the general direction of the transmitting source is of greater amplitude than that of the loop near the end of the coil pointing away from the transmitting source. Hence, this operation determines on which side of a plane, perpendicular to the direction of propagation, and passing through the center of the instrument, the transmitting source is located. By further rotating the coil until the longitudinal axis of the coil points in the actual direction of the transmitting source, the signal either entirely disappears or is reduced to a minimum and reappears again and begins to increase in strength as the coil is displaced in the opposite direction. This evidently offers an effective means for determining the actual direction from which the signals proceed.

Obviously, the wave coil is equally effective in receiving signals traveling in a vertical plane as in an horizontal plane. The wave distribution will be the same in either case if the direction of propagation of electromagnetic waves is perpendicular to the axis of the coil. The coil is, therefore, equally suitable for receiving signals from an airplane station as from a shore station. By turning the coil through an angle in the vertical plane it is possible to ascertain also the vertical direction of the signals, that is, whether the transmitting source is located above or below the horizontal plane passing through the wave coil. By combining therefore, the two rotations, in the horizontal and vertical planes, it is possible to locate the exact position of the transmitting source whether it be a shore station or an airplane station. In addition, by this same combination of motions, the device can be used to determine the inclination of a passing wave front.

In the outline given above, only the most elementary and simplest form of using our invention has been described. In connection with the various figures accompanying this specification, further description relating to various improvements are given in detail. No attempt is made to cover all possible applications. Those given are merely intended to illustrate some of the more important ones.

When using this invention for direction finding it is important that, as far as practicable, the amplifier and all leads and apparatus associated therewith, except the wave coil, should be suitably screened from the action of incoming radio signals, and also from any interaction which might result between the wave coil and such apparatus.

In all of the figures herewith, the same symbols and nomenclature are used to designate the same apparatus, and therefore reference to the various common symbols will not be repeated, except in cases where it is necessary to make clear the difference between the various figures.

In the accompanying drawings, Figure 1 is a diagrammatic view of one form of the device used for the reception of radio signals;

Figure 10:
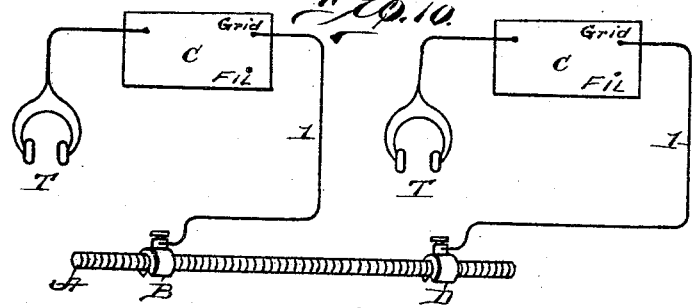
Figure 8:
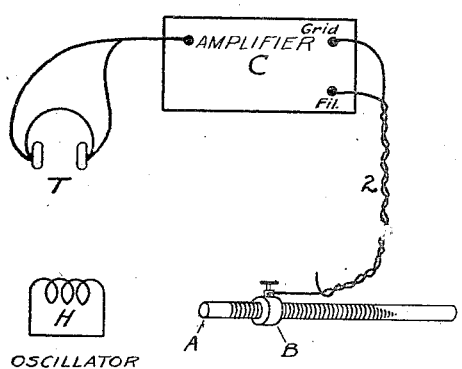
Figure 8 illustrates a method of using the wave coil with separate source of continuous wave oscillation for providing heterodyne or beat effects.
Figure 9:
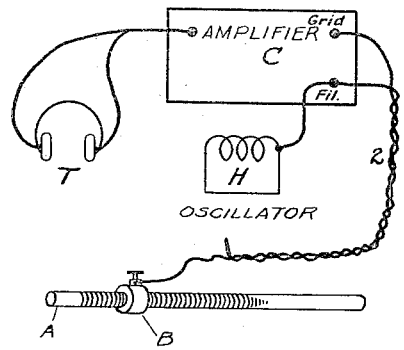

Figure 9 shows a diagrammatic view similar to Figure 8 except that it introduces another method of connecting the apparatus for providing heterodyne or beat effects to the amplifier, and Figure 10 shows an arrangement wherein two amplifiers or detecting devices are connected to two different points on the wave coil, thereby rendering it possible to simultaneously receive signals from two different stations whose wave lengths are different.

Figure 1:
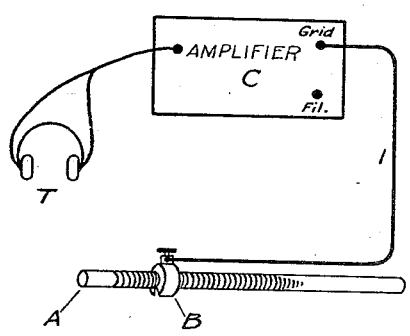

Having more particular reference to the drawings and to Figure 1, A represents the wave coil consisting of a helix of fine insulated copper wire closely wound in a single layer on a suitable insulating tube. We prefer to make the length of the helix greater than its diameter. B indicates a slider consisting of an open metal band capable of being moved along the wave coil. This slider makes an electrostatic connection with the wave coil A. C represents the amplifier or other electron tube receiving device. 1 represents a single lead connecting slider B to the grid input terminal of amplifier C. T represents head telephone receivers. The filament input terminal of the amplifier is left unconnected. It is to be noted that wave coil A has no antenna or ground connection. The circuit connections of the amplifier and the associated plate and filament batteries, etc., are not shown in this or any of the following figures as the amplifier is used in the ordinary way and such connections do not form any part of this invention.

With the simple connections described above, unless special adjustments of the amplifier or special arrangements are introduced, only spark or modulated continuous wave signals would be received.

Figure 2:
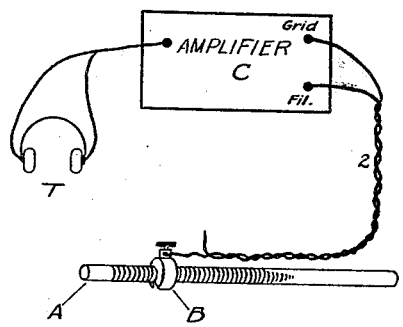
Figure 2 shows a similar diagrammatic view introducing a neutralizing lead.

In the arrangement shown in Figure 2, there is employed lead 2 which consists of a twisted pair of insulated leads, the terminals of which pair are connected at one end to the grid and filament terminals respectively, of amplifier C and at the other end, the lead connected to the grid is connected to slider B while the lead connected to the filament is left disconnected, as shown in the drawing. The advantage of using the twisted pair of leads is that any radio energy that might be picked up by the grid lead is neutralized by an equal amount of energy received by the filament lead, hence no signal is produced in amplifier C due to the energy received by the leads. If provision were not made for neutralizing energy picked up by the grid lead, errors in the accurate determination of direction might result.

Figure 3:
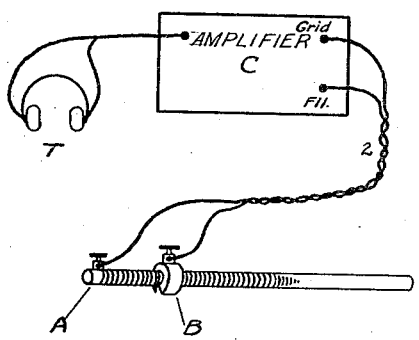
Figure 3 shows a diagrammatic view similar to Figure 1 but introduces a connection to the end of the wave coil which, in general produces a louder signal and permits heterodyning when the amplifier shown in the figure has the proper characteristics.

Another embodiment of the invention is illustrated in Figure 3 wherein the end of the filament lead shown unconnected in Figure 2 is in this figure connected to one end of wave coil A.

This arrangement without the use of additional apparatus permits of the reception of both damped and undamped wave signals, depending merely upon whether or not the amplifier is adjusted for simple amplification and detection, regeneration, or self heterodyne effect.

With the connections shown in Figure 3, the potential distribution on the coil is found to be different than when the apparatus is connected as shown in Figures 1 and 2. Hence slider B for any given station will assume a different position on the coil from that found in the arrangement described under Figure 1.

The arrangement shown in Figure 3 will, in general, produce a louder received signal than the arrangement of Figure 1 without impairing the accuracy of the device as a direction finder.

Figure 4:
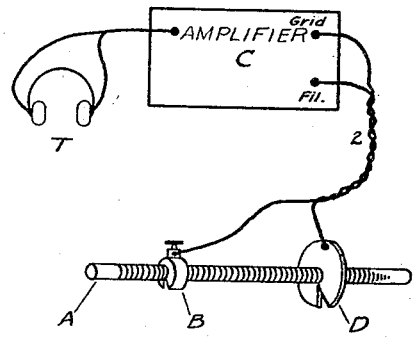
Figure 4 is a like view showing another form of connections which will produce, generally, a similar result to the connections employed in Figure 3.

Figure 4 shows an alternative method of using this device arranged as shown in Figure 3, with the exception of the fact that instead of the lead from the filament being connected to the terminal binding post of the wave coil, it is connected instead to a sliding metal disc D, having a large area and making electrostatic connection with the wave coil.

Figure 5:
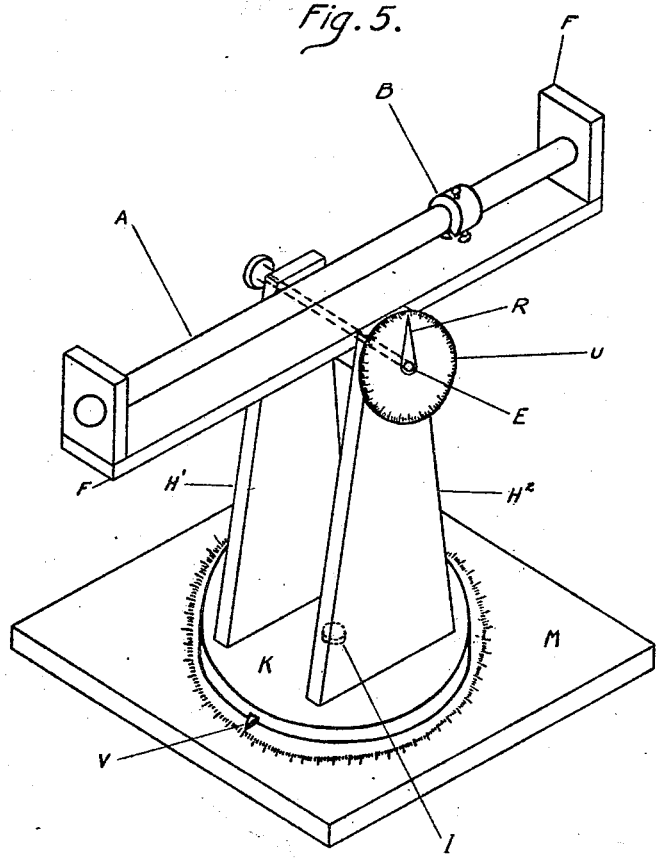
Figure 5 is a perspective view of the wave coil mounted for use as a direction finder.

As means for direction finding or goniometric work an embodiment such as shown in Figure 5 may be advantageously employed wherein A represents the wave coil, B represents the slider which can be moved along the entire length of the coil. The wave coil is attached at each end to a support F. F is supported on a shaft E, to which it is attached. Shaft E is supported in uprights H¹ and H² and can rotate in suitable bearings in the uprights H¹ and H². The uprights H¹ and H² are secured to a disc K. Disc K rests on a stand M. M has a stud I projecting through the hole in disc K, the disc K being capable of rotation about the stud I. To K is attached a pointer V which moves over a scale of degrees on M as indicated in the figure. By means of the indicating pointer V, the angle made by rotating the coil in azimuth with reference to any fixed direction, as, for example, the magnetic meridian, can be determined. To shaft E is attached a pointer R which moves over a vertical scale of degrees U. The pointer R therefore indicates the inclination or dip of the coil A with reference to a horizontal plane through the instrument. By means of the two scales referred to above, the exact position of the coil with respect to vertical and horizontal planes can be recorded.

Various other methods of mounting the wave coil may be employed to accomplish the same result.

Figure 6:
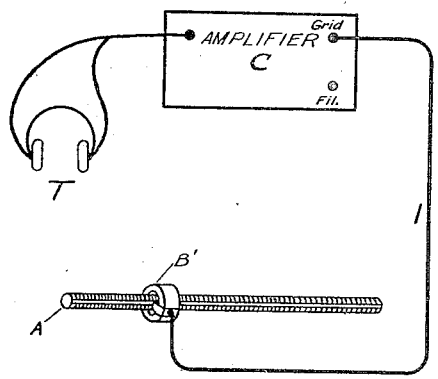
Figure 6 is a diagrammatic view similar to Figure 1 but showing a direct connection to the turns of the wave coil.

The apparatus in Figure 6 is similar to the apparatus described in Figure 1 except that B represents a sliding contact making direct physical connection with that portion of the wires of the wave coil from which the insulation has been removed for a suitable strip along the entire length of the coil.

Figure 7:
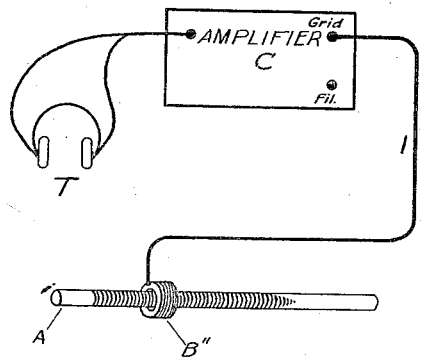
Figure 7 is a diagrammatic view showing an inductive connection to the wave coil.

In Figure 7 the apparatus shown is similar to that shown in Figure 1 except that B″ represents a device for making electromagnetic connection to the wave coil at the point where the loop of current occurs. This device consists of a small concentric coil of wire capable of being slid along the wave coil A as in the case of the metal sliders provided in Figure 1. The lead from the input grid terminal of the amplifier may be connected to either end of this coil B″ or to any intermediate point desired. Various forms of winding coil B″ may be employed.

In Figure 8 the apparatus shown is similar to that described in Figure 2. There is added, however, a separate continuous wave oscillator H, the details of which are not shown in the drawing, which is placed in inductive relation to wave coil A for the production of heterodyne or beat effects. Should this separate oscillator connected inductively to wave coil A be employed in connection with the use of this coil as a direction finder, it is highly desirable that oscillator H be mounted so as to remain in constant fixed coupling relation to wave coil A.

Figure 9 represents the same apparatus as that described in Figure 2 except that oscillator H, the details of which are not shown in the drawing, is, in this case, connected unilaterally to the amplifier C. With this arrangement it is desirable that both amplifier C and oscillator H be shielded from the direct influence of outside radio signals and from any interaction with the wave coil A.

The above specifications and figures are considered to illustrate only some of the elementary forms of this invention and its use. Since this invention primarily consists in the use of a long coil, ungrounded, and not connected to an antenna system and unassociated with tuning arrangements, all the various forms of connecting it in circuit are not specified herein as they will, in general, be evident as obvious modifications to anyone skilled in the art. Among some of the obvious modifications are various forms of winding the wave coil, such as using multiple layer coils instead of the single layer herein described; also a coil may be wound over insulated wires parallel to the longitudinal axis of the coil which are connected electrically to each other at one end and not so connected at the other end, so as to increase the capacity effect of the coil, and by this means to produce a greater number of loops and nodes of potential along the coil than is obtained by the ordinary method of windings.

The form of slider indicated as B in Figure 1 may have various forms. We have found that markedly different effects are produced depending upon the dimensions of the slider. A thin disc of metal of large outer diameter, as shown at D, Figure 4, will produce entirely different effects from those produced by a band similar to that shown at B, Figure 4. In general, the effects are that a slider of form indicated at D gives sharper tuning effects.

By employment of two sliders such as shown at B and D, Figure 10, each one being connected to a separate amplifier or other detecting device, two stations of different wave lengths can be received at the same time. Our invention thus produces a simple form of duplex receiving device. By suitable design of wave coil A and the associated connections, two or more stations of different wave length may be received at the same time.

Another modification of our invention consists in combining two or more wave coils A in various combinations for the purposes of duplex or multiplex reception, increasing the strength of received signals by adding the effects of two or more wave coils.

Still another modification of our invention for increasing the selectivity of the device when used as a direction finder consists of mounting two coils A with their longitudinal axes at right angles to each other.

Our device has many advantages over other methods of reception in that the tuning for various stations consists merely in adjusting the slider or sliders along the wave coil which should be correctly proportioned to the range of wave lengths to be received. In ordinary receiving methods two or more circuits usually have to be accurately tuned, the coupling between the circuits varied, and in practice such receiving devices are rather complicated pieces of apparatus. Our device is distinguished from the others by its simplicity. Our device also provides greater selectivity, enabling powerful interference to be eliminated. It moreover provides a great amount of immunity from static interference.

Claims:

1. A method of using an open circuit resonance wave coil provided with calibration means, and having fixed distributed inductance, for determining the direction of incoming signals, which consists in causing said signals to develop a standing wave on said coil in such manner that two loops of potential are found at approximately equal distances from the ends of said coil, connecting the calibration means unilaterally to the wave coil alternately at two points corresponding to the loops of potential as the position of the wave coil is varied about its center with respect to the position of the transmitting source, and noting the variation of signal strength at each of said loops of potential.

2. A method of using an open circuit resonance wave coil, provided with calibration means, for determining the direction of incoming signals, which consists in causing said signals to develop a standing wave on said coil in such manner that two loops of potential are found at approximately equal distances from the ends of said coil, connecting the calibration means unilaterally to the wave coil alternately at two points corresponding to the loops of potential as the position of the wave coil is varied about its center with respect to the position of the transmitting source, and noting the variation of signal strength at each of said loops of potential.

3. A method of using an open circuit resonance wave coil for determining the direction of incoming radio signals, which consists in causing said signals to develop a standing wave on said coil in such manner that two loops of potential are found at approximately equal distances from the ends of said coil, and then noting the comparative signal strength of said loops while varying the position of said coil with respect to the position of the transmitting source.

J. O. MAUBORGNE.
GUY HILL.